United States Patent
Swanburg et al.

(10) Patent No.: US 8,934,379 B2
(45) Date of Patent: Jan. 13, 2015

(54) SYSTEMS AND METHODS FOR DELAYED MESSAGE DELIVERY

(75) Inventors: Scott Swanburg, Coral Springs, FL (US); Andre Okada, Seattle, WA (US); Paul Hanson, Kirkland, WA (US); Chris Young, Roswell, GA (US); Adrianne Luu, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 870 days.

(21) Appl. No.: 12/053,512

(22) Filed: Mar. 21, 2008

(65) Prior Publication Data

US 2009/0285129 A1 Nov. 19, 2009

Related U.S. Application Data

(60) Provisional application No. 60/896,728, filed on Mar. 23, 2007.

(51) Int. Cl.
*H04L 12/16* (2006.01)
*H04M 1/2745* (2006.01)
(Continued)

(52) U.S. Cl.
CPC ... *H04M 1/274516* (2013.01); *H04L 29/12169* (2013.01); *H04L 61/1547* (2013.01); *H04M 1/274508* (2013.01); *H04M 1/72572* (2013.01); *H04L 29/12047* (2013.01); *H04L 61/1594* (2013.01); *H04L 51/14* (2013.01); *H04L 67/1095* (2013.01); *H04L 29/12132* (2013.01);
(Continued)

(58) Field of Classification Search
None
See application file for complete search history.

(56) References Cited

U.S. PATENT DOCUMENTS 5,692,032 A 11/1997 Seppanen et al.
5,894,506 A 4/1999 Pinter
(Continued)

FOREIGN PATENT DOCUMENTS

EP 1359777 11/2003
EP 1569426 8/2005
(Continued)

OTHER PUBLICATIONS

"3rd Generation Partnership Project; Technical Specification Group Services and System Aspects; Support of SMS and MMS Over Generic 3GPP IP Access", 3GPP TR 23.804 v7.1.0 (Sep. 2005).
(Continued)

*Primary Examiner* — Minh-Trang Nguyen
(74) *Attorney, Agent, or Firm* — Hartman & Citrin LLC

(57) ABSTRACT

A system for delayed message delivery can include an IP Multimedia Subsystem (IMS) network that is in communication with at least one of a first user equipment and a second user equipment, and a message application server. The message application server can be configured to receive a message sent from the first user equipment, store the message temporarily in accordance with a time parameter, and send the message to a gateway when the time parameter is satisfied. The gateway can be configured to receive a message formatted in accordance with a first protocol used by the IMS network and convert the message into a format in accordance with a second protocol used by a message center. The message center can be configured to receive the message formatted in accordance with the second protocol and forward the message to the second user equipment. Other systems for delayed message delivery and corresponding methods are disclosed.

16 Claims, 5 Drawing Sheets

(51) Int. Cl.
  *H04M 1/725* (2006.01)
  *H04L 29/08* (2006.01)
  *H04L 29/12* (2006.01)
  *H04L 12/58* (2006.01)
  *H04M 3/42* (2006.01)

(52) U.S. Cl.
  CPC ............ *H04L 61/1576* (2013.01); *H04L 51/28* (2013.01); *H04M 2250/10* (2013.01); *H04L 61/1552* (2013.01); *H04M 3/42382* (2013.01); *H04M 2203/2011* (2013.01); *H04L 29/12122* (2013.01)
  USPC ........................................................ 370/259

(56) References Cited

U.S. PATENT DOCUMENTS

| | | |
|---|---|---|
| 5,905,959 A | 5/1999 | Foladare et al. |
| 5,943,399 A | 8/1999 | Bannister et al. |
| 6,044,275 A * | 3/2000 | Boltz et al. ............... 455/466 |
| 6,085,201 A | 7/2000 | Tso |
| 6,138,008 A | 10/2000 | Dunn et al. |
| 6,182,059 B1 | 1/2001 | Angotti et al. |
| 6,278,968 B1 | 8/2001 | Franz et al. |
| 6,356,633 B1 | 3/2002 | Armstrong |
| 6,393,421 B1 | 5/2002 | Paglin |
| 6,411,947 B1 | 6/2002 | Rice et al. |
| 6,477,551 B1 | 11/2002 | Johnson et al. |
| 6,480,484 B2 | 11/2002 | Morton |
| 6,522,877 B1 | 2/2003 | Lietsalmi et al. |
| 6,718,368 B1 | 4/2004 | Ayyadurai |
| 7,058,652 B2 | 6/2006 | Czarnecki et al. |
| 7,137,070 B2 | 11/2006 | Brown et al. |
| 7,149,782 B2 | 12/2006 | Sommerer |
| 7,383,250 B2 | 6/2008 | Scian et al. |
| 7,546,131 B1 | 6/2009 | Sidi et al. |
| 7,657,600 B2 | 2/2010 | Auhagen |
| 7,844,666 B2 | 11/2010 | Horvitz et al. |
| 7,925,620 B1 | 4/2011 | Yoon |
| 8,069,143 B2 | 11/2011 | Swanburg et al. |
| 2001/0041566 A1 * | 11/2001 | Xanthos et al. ............... 455/423 |
| 2002/0007346 A1 | 1/2002 | Qiu et al. |
| 2002/0035684 A1 | 3/2002 | Vogel et al. |
| 2002/0138582 A1 | 9/2002 | Chandra et al. |
| 2002/0169841 A1 | 11/2002 | Carlson et al. |
| 2002/0178041 A1 | 11/2002 | Krantz et al. |
| 2003/0154256 A1 | 8/2003 | Hadano et al. |
| 2003/0193951 A1 * | 10/2003 | Fenton et al. .................. 370/392 |
| 2004/0059700 A1 | 3/2004 | Park et al. |
| 2004/0128151 A1 | 7/2004 | Mock et al. |
| 2004/0208297 A1 | 10/2004 | Valentine |
| 2005/0021551 A1 | 1/2005 | Silva et al. |
| 2005/0074169 A1 | 4/2005 | Filatov et al. |
| 2005/0120084 A1 | 6/2005 | Hu et al. |
| 2005/0198582 A1 | 9/2005 | Hennum et al. |
| 2005/0209861 A1 * | 9/2005 | Hewes et al. ...................... 705/1 |
| 2006/0030297 A1 * | 2/2006 | Coble et al. ................ 455/412.1 |
| 2006/0052091 A1 | 3/2006 | Onyon et al. |
| 2006/0095575 A1 * | 5/2006 | Sureka et al. ................. 709/227 |
| 2006/0104429 A1 | 5/2006 | Wouterse et al. |
| 2006/0115062 A1 | 6/2006 | Gonder et al. |
| 2006/0246881 A1 | 11/2006 | Winkler et al. |
| 2006/0250987 A1 * | 11/2006 | White et al. .................. 370/260 |
| 2006/0274721 A1 * | 12/2006 | Flanagan ...................... 370/352 |
| 2006/0277176 A1 | 12/2006 | Liao |
| 2007/0022099 A1 | 1/2007 | Yoshimura et al. |
| 2007/0026852 A1 | 2/2007 | Logan et al. |
| 2007/0064920 A1 | 3/2007 | Ruckart |
| 2007/0073810 A1 | 3/2007 | Adams et al. |
| 2007/0088798 A1 | 4/2007 | Merrill et al. |
| 2007/0136431 A1 * | 6/2007 | Sun ................................ 709/206 |
| 2007/0233736 A1 | 10/2007 | Xiong et al. |
| 2007/0249379 A1 * | 10/2007 | Bantukul ...................... 455/466 |
| 2007/0266118 A1 | 11/2007 | Wilkins |
| 2007/0266156 A1 | 11/2007 | Wilkins |
| 2008/0004005 A1 | 1/2008 | Jensen |
| 2008/0133677 A1 | 6/2008 | Pattabhiraman et al. |
| 2008/0189293 A1 | 8/2008 | Strandel et al. |
| 2008/0235242 A1 | 9/2008 | Swanburg et al. |
| 2008/0250332 A1 | 10/2008 | Farrell et al. |
| 2008/0300982 A1 | 12/2008 | Larson et al. |
| 2009/0022285 A1 | 1/2009 | Swanburg et al. |
| 2010/0179991 A1 | 7/2010 | Lorch et al. |
| 2010/0287241 A1 | 11/2010 | Swanburg et al. |
| 2012/0066177 A1 | 3/2012 | Swanburg et al. |

FOREIGN PATENT DOCUMENTS

| | | |
|---|---|---|
| EP | 1755294 | 2/2007 |
| WO | 9949679 | 9/1999 |
| WO | 02087197 | 10/2002 |
| WO | 2005015927 | 2/2005 |
| WO | 2008118878 | 10/2008 |

OTHER PUBLICATIONS

U.S. Office Action dated Jul. 16, 2010 in U.S. Appl. No. 12/051,336.
U.S. Office Action dated Dec. 27, 2010 in U.S. Appl. No. 12/051,336.
U.S. Notice of Allowance dated Jul. 15, 2011 in U.S. Appl. No. 12/051,336.
U.S. Office Action dated Sep. 21, 2011 in U.S. Appl. No. 12/053,525.
U.S. Office Action dated Aug. 6, 2012 in U.S. Appl. No. 12/053,525.
U.S. Office Action dated Dec. 23, 2010 in U.S. Appl. No. 12/279,756.
U.S. Office Action dated Jul. 8, 2011 in U.S. Appl. No. 12/279,756.
U.S. Office Action dated Dec. 7, 2009 in U.S. Appl. No. 11/873,031.
U.S. Office Action dated May 26, 2010 in U.S. Appl. No. 11/873,031.
U.S. Office Action dated Feb. 16, 2012 in U.S. Appl. No. 11/873,031.
U.S. Office Action dated Jul. 25, 2012 in U.S. Appl. No. 11/873,031.
Pearlman, L., "A Community Authorization Service for Group Collaboration," Jun. 2002, IEEE 3rd International Workshop, pp. 50-59.
Notice of Allowance mailed on Mar. 6, 2014 in U.S. Appl. No. 12/053,525.
Office Action mailed on Sep. 11, 2013 in U.S. Appl. No. 12/279,756.
Office Action mailed on Nov. 25, 2012 in U.S. Appl. No. 13/296,374.
Non-final Office Action mailed on Apr. 8, 2014 in U.S. Appl. No. 12/279,756.
International Application No. PCT/US2008/058052 Written Opinion dated Sep. 29, 2009.
International Application No. PCT/US2008/058052 International Search Report dated Oct. 7, 2008.
International Application No. PCT/US2008/058055 Written Opinion dated Sep. 29, 2009.
International Application No. PCT/US2008/058055 International Search Report dated Jul. 3, 2009.
International Application No. PCT/US2008/058057 Written Opinion dated Sep. 29, 2009.
International Application No. PCT/US2008/058057 International Search Report dated Jul. 7, 2008.
International Application No. PCT/US2008/058064 Written Opinion dated Sep. 29, 2009.
International Application No. PCT/US2008/058064 International Search Report dated Aug. 21, 2008.
International Application No. PCT/US2008/058067 Written Opinion dated Sep. 29, 2009.
International Application No. PCT/US2008/058067 International Search Report dated Oct. 27, 2008.
Office Action mailed Oct. 21, 2104, in U.S. Appl. No. 12/279,756.

* cited by examiner

SYSTEMS AND METHODS FOR DELAYED MESSAGE DELIVERY

CROSS-REFERENCE TO RELATED APPLICATIONS

This application claims priority to U.S. Provisional Application No. 60/896,728, filed Mar. 23, 2007, the entirety of which is hereby incorporated by reference.

TECHNICAL FIELD

The present application relates generally to messaging and, more particularly, to systems and methods for providing delayed message delivery.

BACKGROUND

Short Message Service (SMS) allows users to exchange text messages between capable mobile phones and other devices within a wireless communications network. SMS is a store and forward service. In other words, text messages are not sent directly from sender to recipient. Rather, text messages are sent to an SMS Center (SMSC). Each wireless communications network can include multiple SMSCs to manage the receipt, storage, and forwarding of text messages.

SMS features message delivery confirmation so that the sender can receive a return message notifying them whether or not the short message has been delivered. SMS messages can be sent and received simultaneously with GSM (Global System for Mobile Communications) voice, data, and fax calls. This is possible because SMS messages are sent using the signaling path and not a dedicated radio channel. As such, users of SMS rarely, if ever, get a busy or engaged signal as they can do during peak network usage times. SMS delivery, however, is not guaranteed. In some instances, the message is lost and never sent to the recipient.

Multimedia Messaging Service (MMS) allows users to exchange multimedia communications between capable mobile phones and other devices. MMS is an extension of the SMS protocol and defines a way to send and receive messages that include images, audio, and video in addition to text.

SUMMARY

The present application provides various systems and methods for delayed message delivery. In a first aspect of the present application, a system for delayed message delivery includes an IP Multimedia Subsystem (IMS) network that is in communication with at least one of a first user equipment and a second user equipment, and a message application server. The message application server can be configured to receive a message sent from the first user equipment, store the message temporarily in accordance with a time parameter, and send the message to a gateway when the time parameter is satisfied. The gateway can be configured to receive a message formatted in accordance with a first protocol used by the IMS network and convert the message into a format in accordance with a second protocol used by a message center. The message center can be configured to receive the message formatted in accordance with the second protocol and forward the message to the second user equipment.

In another aspect of the present application, a method for providing a delayed message delivery feature includes creating a message on a first user equipment. The message can include a message body, a telephone number, and a time parameter sending the message in a format of a first protocol to an IP Multimedia Subsystem (IMS) network. The IMS network can send the message to a message application server for temporary storage in accordance with the time parameter. The message application server can send the message to a message gateway when the time parameter is satisfied. The message gateway can convert the message from the first protocol to a second protocol compatible with a message center and send the message to the message center. The message center can send the message to a second user equipment identified by the telephone number.

In yet another aspect of the present application, a system for delayed message delivery includes a first user equipment, a second user equipment, a message center, capable of communication with the first user equipment and the second user equipment, and a message application server, in communication the message center. The message application server can be configured to receive a message sent from the first user equipment, store the message temporarily in accordance with a time parameter, and send the message to the message center when the time parameter is satisfied.

In still another aspect of the present application, a method for providing a delayed message delivery feature includes creating a message on a first user equipment. The message can include a message body, a telephone number, and a time parameter. The method further includes establishing a data session between the first user equipment and a message application server, sending the message to the message application server for temporary storage in accordance with the time parameter, sending the message from the message application server to a message center when the time parameter is satisfied, and sending the message from the message center to a second user equipment identified by the telephone number.

In another aspect of the present application, a method for providing a delayed message delivery feature includes specifying a time parameter and creating a message on a user equipment. The message can include a message body, a telephone number associated with the user equipment, and the time parameter. The method can further include establishing a data session between the user equipment and a message application server, sending the message to the message application server for temporary storage in accordance with the time parameter, sending the message from the message application server to a message center when the time parameter is satisfied, and sending the message from the message center to the user equipment identified by the telephone number.

In one embodiment of the aforementioned aspects, the time parameter can include at least one of a date and time when the message is sent. In another embodiment, the time parameter can include a time value for a timer, the expiration of which prompts the message to be sent.

In one embodiment of the aforementioned aspects, the first protocol is Session Initiation Protocol (SIP) and the second protocol is Short Message Service (SMS) protocol. In another embodiment, the first protocol is SIP protocol and the second protocol is Multimedia Message Service (MMS) protocol. In yet another embodiment, the first protocol is SIP protocol and the second protocol is a voicemail protocol.

In one embodiment of the aforementioned aspects, the message center is an SMS center (SMSC). In another embodiment, the message center is an MMS center (MMSC). In yet another embodiment, the message center is a voicemail platform.

DETAILED DESCRIPTION

As required, detailed embodiments of the present application are disclosed herein. It must be understood that the disclosed embodiments are merely exemplary examples of the application that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present application. Therefore, specific structural and functional details disclosed herein are not to be interpreted as limiting, but merely as a basis for the claims and as a representative basis for teaching one skilled in the art to variously employ the present application.

Figure 1:
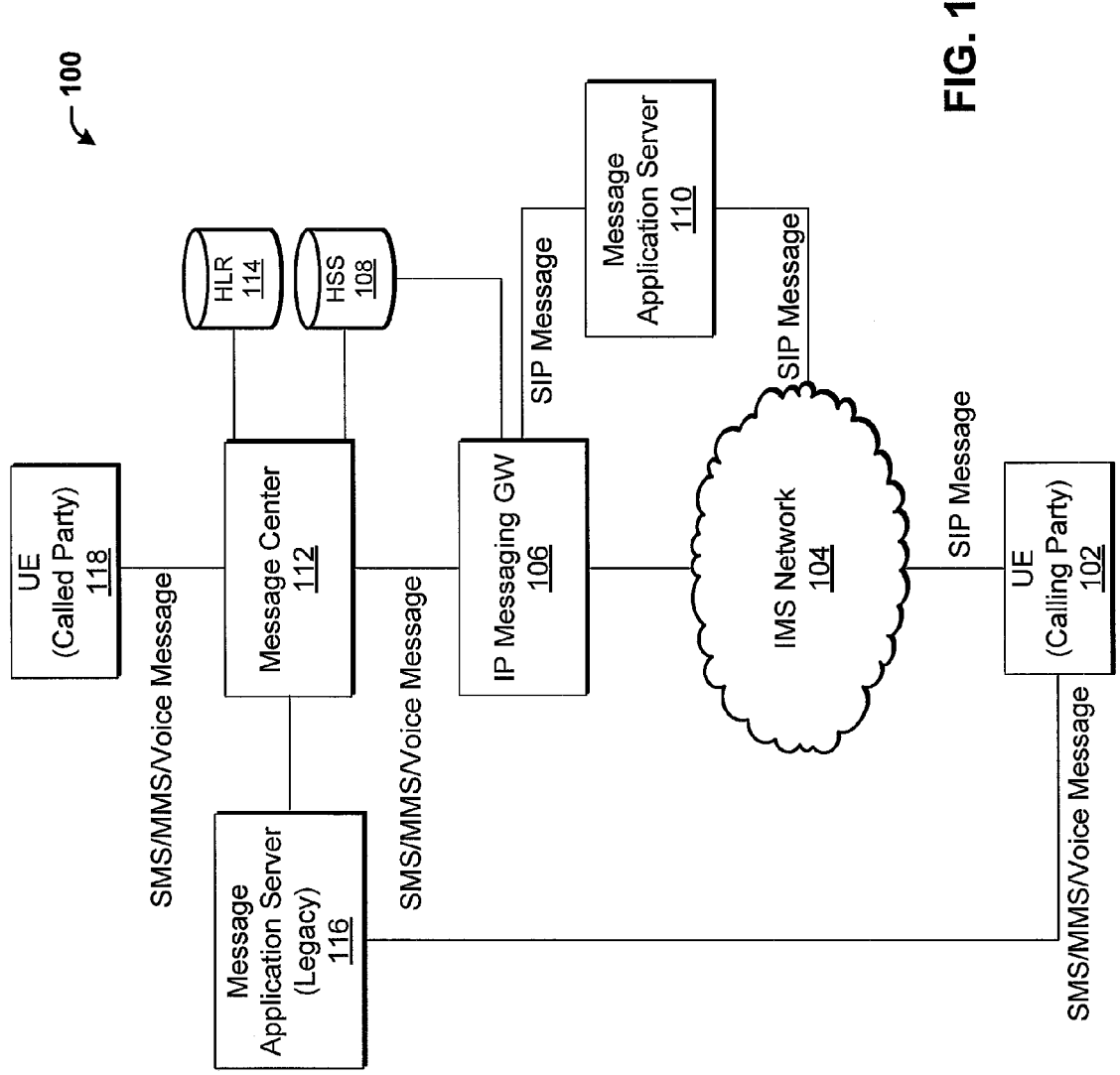
FIG. 1 schematically illustrates an exemplary wireless communications network, according to the present application.

Referring to the drawings wherein like numerals represent like elements throughout the several views, FIG. 1 illustrates an exemplary wireless communications network 100 for providing delayed message delivery in accordance with the present application. The wireless communications network 100 can operate in accordance with any mobile communications standard or proprietary technology. By way of example, the wireless communications network 100 can be configured as a 2G GSM (Global System for Mobile communications) network and can provide data communications via GPRS (General Packet Radio Service), and EDGE (Enhanced Data rates for GSM Evolution). By way of further example, the wireless communications network 100 can be configured as a 3G UMTS (Universal Mobile Telecommunications System) network and can provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 100 is also compatible with future mobile communications standards including, but not limited to, pre-4G and 4G, for example. Moreover, the wireless communications network 100 can be configured to support any current or future messaging protocol, such as, but not limited to, Short Message Service (SMS) protocol, evolutions thereof, improvements thereof, and extensions thereof. Multimedia Message Service (MMS) protocol, for example, is an extension of SMS protocol. Accordingly, the wireless communications network 100 is described in context of SMS messages, MMS messages, and voice messages, though application of the present teachings to other messaging types is also contemplated and included in the scope of the appended claims.

The illustrated wireless communications network 100 includes a calling party user equipment (UE) 102 that is configured to create a message that includes a future date and/or time for delivery to one or more recipients. The calling party UE 102 can be a mobile phone, handheld computer, other computer, messaging device, or other device, for example. In one embodiment, the calling party UE 102 is in communication with an IP Multimedia Subsystem (IMS) network 104 that is configured to receive the message and a date and/or time for future delivery. The message can be formatted in accordance with the Session Initiation Protocol (SIP) used by the IMS network 104, for example. It should be understood that other protocols are contemplated, such as, but not limited to, evolutions, improvements, and extensions of the SIP protocol and related IMS protocols.

The IMS network 104 is access-network-independent as it supports multiple access types including GSM, WCDMA, CDMA2000, WLAN, wireline broadband and other packet data applications, for example. IMS is a standardized reference architecture. IMS consists of session control, connection control, and an applications services framework along with subscriber and services data. IMS enables new converged voice and data services, while allowing for the interoperability of these converged services between Internet and cellular subscribers. IMS uses open standard IP protocols, defined by the IETF (Internet Engineering Task Force). Users can execute all their services when roaming as well as from their home networks.

The illustrated IMS network 104 is in communication with an IP messaging gateway 106 that, in turn, is in communication with a home subscriber server (HSS) 108 and a message application server 110. The message application server 110 is also in communication with the IMS network 104.

The IP messaging gateway 106 provides a gateway function to a message center 112. The IP messaging gateway 106 can also convert messages from IP protocols, such as SIP, to a protocol used by the message center 112, such as SMS protocol, for example. The message center 112 can be, but is not limited to, an SMS center (SMSC), an MMS center (MMSC), or a voicemail server, for example. Accordingly, the message center 112 can be configured to manage text, multimedia, and voice messages. The message center 112 is illustrated as being in communication with the HSS 108, a home location register 114, and a legacy message application server 116. The message center 112 is also illustrated as being in communication with a called party UE 118.

If the calling party UE 102 is not compatible with the IMS network 104, the calling party UE 102 can send messages to the legacy application server 116. Accordingly, in this embodiment, the message can be formatted in accordance with the message protocol used by the message center 112 and no conversion is necessary. The legacy application server 116 can be a separate network entity or can be combined with other network elements, such as the message center 112.

Figure 2:
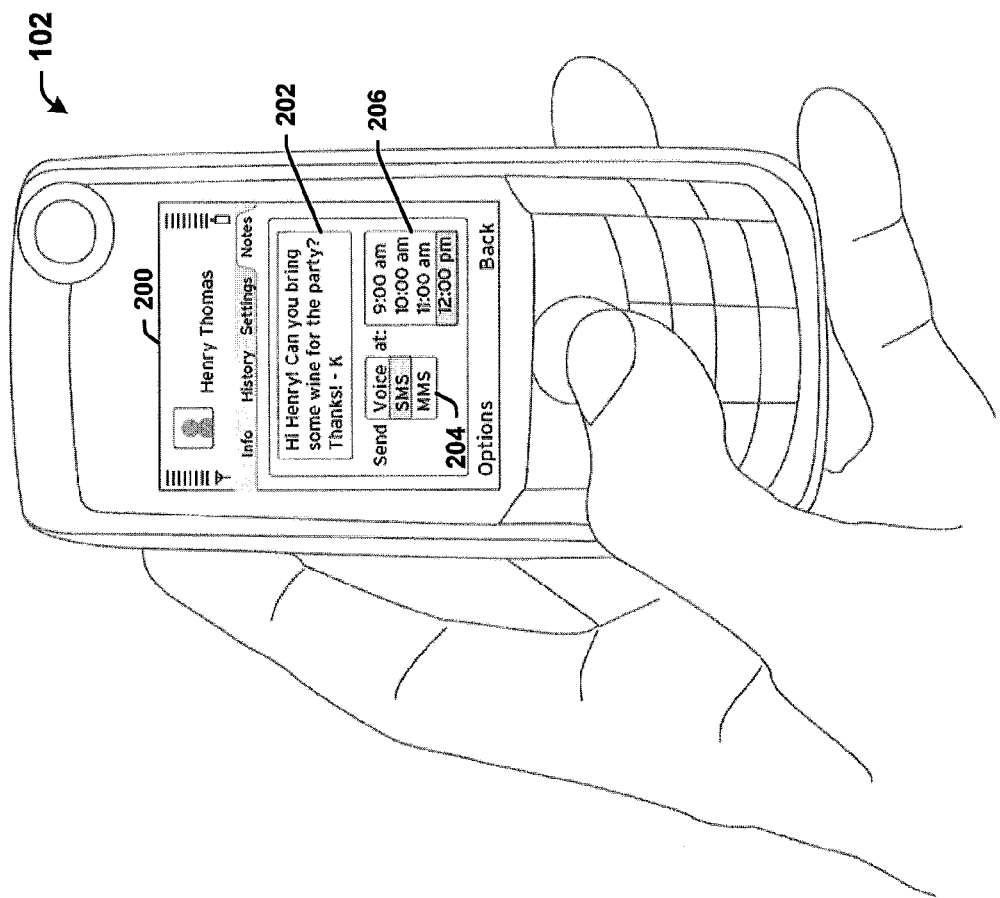
FIG. 2 illustrates an exemplary graphical user interface on a calling party user equipment, according to the present application.

Referring now to FIG. 2, an exemplary graphical user interface 200 on a calling party UE 102 is schematically illustrated. The illustrated graphical user interface 200 includes a message entry box 202, a message type option menu 204, and a time selection menu 206. The message entry box 202 accepts input from the user for the text body of a message. The message type option menu 204 provides the user with an option to select the type of message the user would like to send. As illustrated, the message type option menu 204 can include, for example, voice, SMS, and MMS message options and the SMS option is selected. The time selection menu 206 provides the user with an option to select the time a user would like to send the message. In addition, the time selection menu 206 can include an option to select a date the user would like to send the message. Alternatively, a time entry box (not shown) can be provided to the user so that the user can enter the date and/or time. It is noted that any time can be entered, and that the times shown are provided as exemplary example only.

Figure 3:
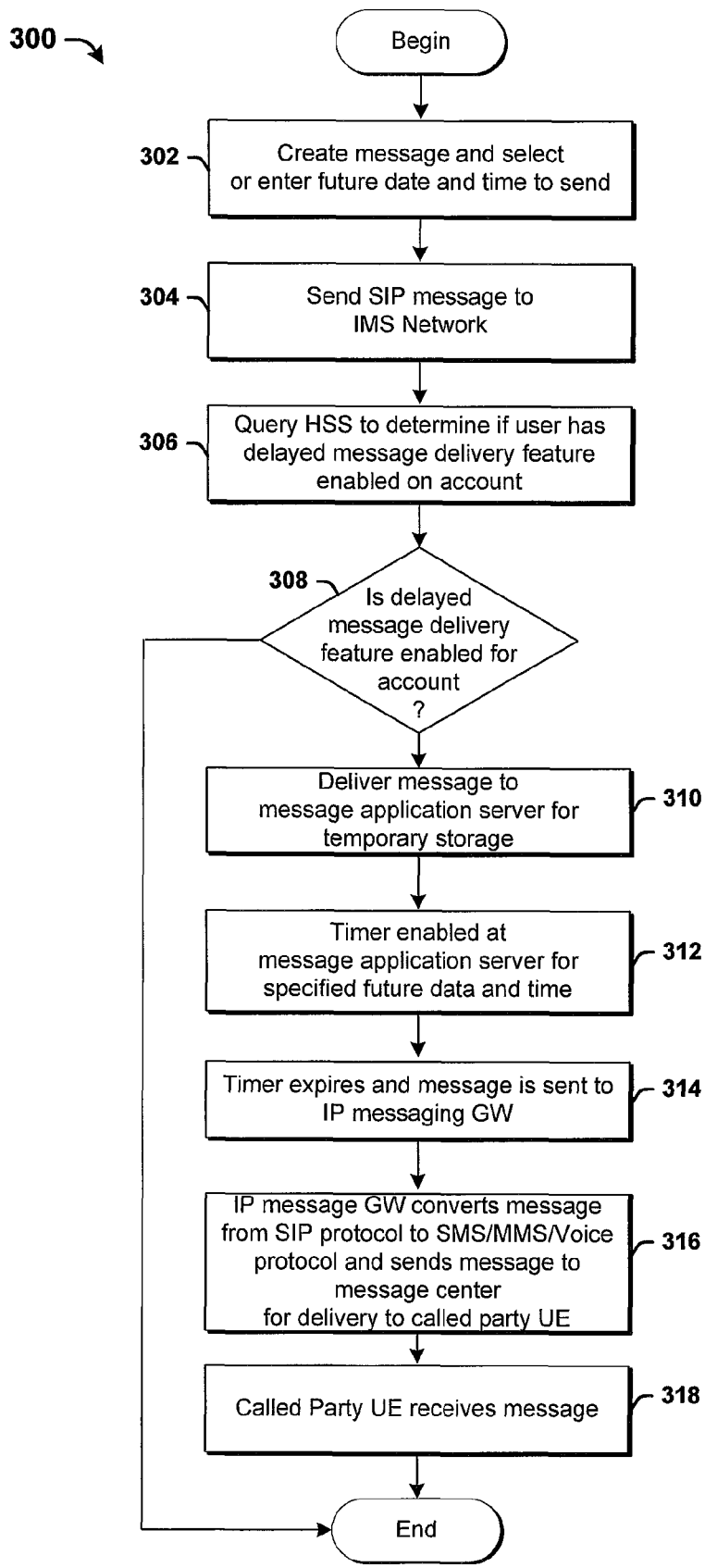
FIG. 3 schematically illustrates an exemplary method for providing delayed message delivery in accordance with an embodiment of the present application.

Referring now to FIG. 3, an exemplary method 300 for providing delayed message delivery via the IMS network 104 is schematically illustrated. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium. The method 300 is described below.

The method 300 begins and flow proceeds to step 302, wherein a message is created based upon user input. For example, a user operating the calling party UE 102 can enter text and/or select an image, select or enter one or more recipients' telephone numbers, and select or enter a future date and/or time the user desires the message to be sent. The calling party UE 102 creates a corresponding message. The message can be formatted as a SIP message, for example. The message is sent to the IMS network 104, at step 304.

At step 306, the IMS network 104 sends a query to the HSS 108 to determine if the user has the delayed message delivery feature is enabled on the user's account. It should be understood that a delayed message delivery feature can be provided as a free feature for message service subscribers or can be provided with a one-time charge, per-use charge, or monthly recurring charge. A delayed message delivery feature can be offered to prepaid and/or post-paid subscribers.

At step 308, it is determined if the user has the delayed message feature enabled on their account. If the delayed message feature is enabled for the user's account, the method 300 proceeds to step 310 and the message is delivered to the message application server 110 for storage until the date and/or time specified in the message. Otherwise, the message is not sent or the message is sent immediately in accordance with current protocols and the method 300 ends.

At step 312, one or more timers can be enabled with one or more time values as a countdown to the future date and/or time specified in the message. When the timer expires the message is sent to the IP message gateway 106, at step 314. Alternatively or in addition, one or more trigger events can be set for the specified date and time. In addition, a timer or a trigger event can be set to expire or activate at a time different from the specified time such that any delay in receiving the message at the called party UE 118 can be minimized.

At step 316, the IP message gateway 106 converts the message from SIP protocol to the appropriate message protocol and sends the message to the message center 112 for delivery to the called party UE 118. The message is sent to the called party UE 118. At step 318, the called party UE 118 receives the message. The method 300 ends.

Figure 4:
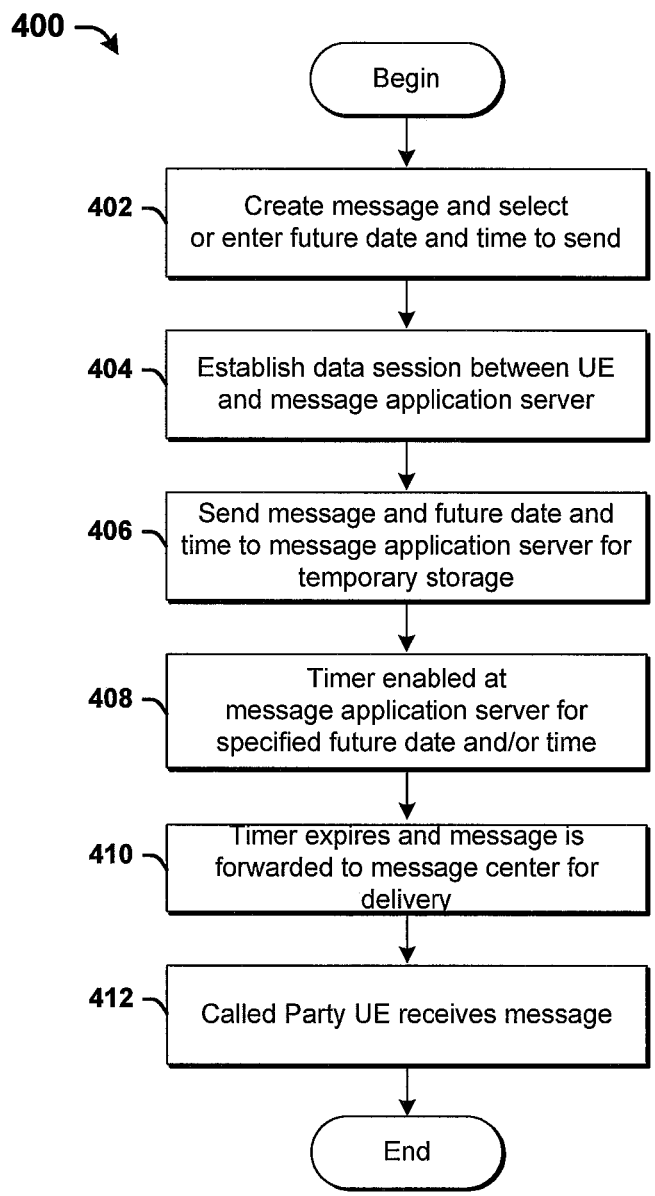
FIG. 4 schematically illustrates an exemplary method for providing delayed message delivery in accordance with another embodiment of the present application.

Referring now to FIG. 4, an exemplary method 400 for providing delayed message delivery via a legacy network is schematically illustrated. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium. The method 400 is described below.

The method 400 begins and flow proceeds to step 402, wherein a message is created based upon user input. For example, a user operating the calling party UE 102 can enter text and/or select an image, select or enter one or more recipients telephone numbers, and select or enter a future date and time the user desires the message to be sent. The calling party UE 102 creates a corresponding message.

At step 404, a data session is established between the calling party UE 102 and the legacy message application server 116. At step 406, the message and the future date and time are sent to the legacy message application server 116 for temporary storage.

At step 408, a timer is enabled for the future date and time specified in the message. When the timer expires the message is forwarded to the message center 112 for delivery to the called party UE 118, at step 410. At step 412, the called party UE 118 receives the message. The method 400 ends Alternatively, a trigger event can be set for the specified date and time. In addition, a timer or a trigger event can be set to expire or activate at a time different from the specified time such that any delay in receiving the message at the called party UE 118 can be minimized. It should be understood that more than one timer and/or more than one trigger event can be set or a combination thereof.

As an alternative to the aforementioned methods described in FIG. 3 and FIG. 4, a delayed message can be sent from and received by the same device. Accordingly, a delayed message can include a reminder that can be sent at a later date and/or time to remind a user of a task, meeting, item to be purchased, birthday, special event, or for anything else the user may need to be reminded.

Figure 5:
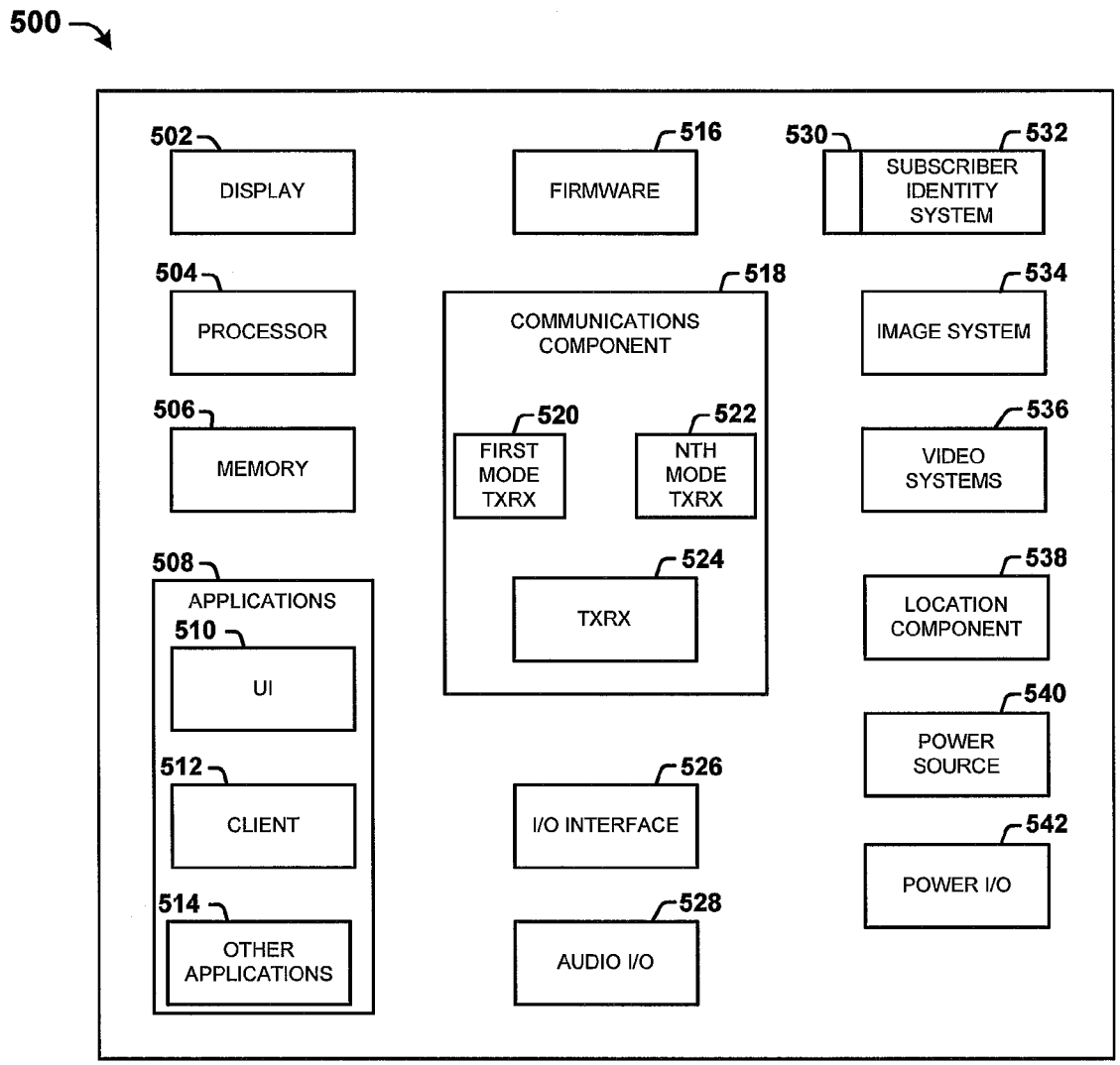
FIG. 5 schematically illustrates an exemplary device configured in accordance with an embodiment of the present application.

Referring now to FIG. 5, a block diagram illustrating various components of an exemplary device 500 is shown, according to the present application. Although no connections are shown between the components illustrated and described in FIG. 5, the components can interact with each other to carry out device functions.

As illustrated, the device 500 can be a single-mode or multi-mode mobile communications device. FIG. 5 and the following discussion are intended to provide a brief, general description of a suitable environment in which the various aspects of an embodiment of the present application can be implemented. While the description includes a general context of computer-executable instructions, the present application can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 500 includes a display 502 for displaying multimedia such as, for example, text, images, video, telephony functions, caller line ID data, setup functions, menus, messages, wallpaper, graphics, and the like. The device 500 also includes a processor 504 for controlling and/or processing data. A memory 506 can interface with the processor 504 for the storage of data and/or applications 508. The memory 506 can include a variety of computer readable media including, but not limited to, volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD-ROM, DVD, or other optical disk storage, magnetic tape, magnetic disk storage, other magnetic storage devices, or any other medium that can be used to store the desired information and that can be accessed by the device 500.

The memory 506 can be configured to store one or more applications 508. The applications 508 can also include a user interface (UI) application 510. The UI application 510 can interface with a client 512 (e.g., an operating system) to facilitate user interaction with device functionality and data, for example, answering/initiating calls, entering/deleting data, configuring settings, address book manipulation, multi-mode interaction, and the like. The applications 508 can include other applications 514, such as, for example, a delayed messaging application. The applications 508 can be stored in the memory 506 and/or in a firmware 516, and can be executed by the processor 504. The firmware 516 can also store code for execution during initialization of the device 500.

A communications component 518 can interface with the processor 504 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 518 can also include a multi-mode communications subsystem for providing cellular communications via different cellular technologies. For example, a first cellular transceiver 520 can operate in one mode, for example, GSM, and an Nth transceiver 522 can operate in a different mode, for example WiFi. While only two transceivers 520, 522 are illustrated, it should be appreciated that a plurality of transceivers can be included. The communications component 518 can also include a transceiver 524 for unlicensed RF communications using technology such as, for example, WiFi, WiMAX, near-field communications, other RF, and the like. The transceiver 524 can also be configured for line-of-sight technologies, such as, infrared and IRDA, for example. Although a single transceiver 524 is illustrated, multiple transceivers for unlicensed RF and line-of-sight technologies are contemplated.

The communications component 518 can also facilitate communications reception from terrestrial radio networks, digital satellite radio networks, Internet-based radio services networks, combinations thereof, and the like. The communications component 518 can process data from a network, such as, for example, the Internet, a corporate WAN, an intranet, a home broadband network, and the like, via an ISP, DSL provider, or other broadband service provider.

An input/output (I/O) interface 526 can be provided for input/output of data and/or signals. The I/O interface 526 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, multi-touch screen, touch pad, trackball, joy stick, controller, monitor, display, LCD, plasma, OLED, combinations thereof, and the like.

Audio capabilities can be provided by an audio I/O component 528 that can include a speaker (not shown) for the output of audio signals and a microphone (not shown) to collect audio signals.

The device 500 can include a slot interface 530 for accommodating a subscriber identity system 532, such as, for example, a SIM or universal SIM (USIM). The subscriber identity system 532 instead can be manufactured into the device 500, thereby obviating the need for a slot interface 530.

The device 500 can include an image capture and processing system 534. Photos and/or videos can be obtained via an associated image capture subsystem of the image system 534, for example, a camera. The device 500 can also include a video systems component 536 for processing, recording, and/or transmitting video content.

A location component 538 can be included to send and/or receive signals, such as, for example, GPS data, assisted GPS data, triangulation data, combinations thereof, and the like. The device 500 can use the received data to identify its location or can transmit data used by other devices to determine the device 500 location.

The device 500 can include a power source 540 such as batteries and/or other power subsystem (AC or DC). The power source 540 can be single-use, continuous, or rechargeable. In the case of the latter, the power source 540 can interface with an external power system or charging equipment via a power I/O component 542.

The law does not require and it is economically prohibitive to illustrate and teach every possible embodiment of the present claims. Hence, the above-described embodiments are merely exemplary illustrations of implementations set forth for a clear understanding of the principles of the application. Variations, modifications, and combinations may be made to the above-described embodiments without departing from the scope of the claims. All such variations, modifications, and combinations are included herein by the scope of this disclosure and the following claims.

What is claimed is:

1. A system comprising:
a message application server, in communication with an Internet Protocol Multimedia Subsystem network and an Internet Protocol messaging gateway, the message application server being configured to perform operations comprising
receiving a message from a first user equipment in response to a determination having been made that an account associated with the first user equipment has a message delivery feature enabled, the message being addressed to a second user equipment, the message being formatted in accordance with a first protocol used by the Internet Protocol Multimedia Subsystem network, and the message comprising a time parameter provided by a user of the first user equipment,
storing the message in accordance with the time parameter, and
sending the message to the Internet Protocol messaging gateway in response to the time parameter being satisfied; and
the Internet Protocol messaging gateway, in communication with the message application server and a message center, the Internet Protocol messaging gateway being configured to perform operations comprising
receiving the message from the message application server,
converting the message from the first protocol to a second protocol used by the message center, and sending the message in the second protocol to the message center for delivery to the second user equipment.

2. The system of claim 1, wherein the time parameter comprises a date, a time, or a date and a time at which the message is to be sent.

3. The system of claim 1, wherein the time parameter comprises a time value for a timer, an expiration of which prompts the message to be sent.

4. The system of claim 1, further comprising the Internet Protocol Multimedia Subsystem network, wherein the Internet Protocol Multimedia Subsystem network is configured to perform operations comprising:
   querying a home subscriber server to determine if a delayed message delivery feature is enabled for the account; and
   sending the message to the message application server in response to determining that the delayed message delivery feature is enabled for the account.

5. The system of claim 1, wherein the message delivery feature is provided to the user for free, for a one-time charge for a per-use charge, or for a periodic charge.

6. The system of claim 1, wherein the account is a postpaid account or a pre-paid account.

7. The system of claim 1, wherein the time parameter is associated with a triggering event and the time parameter being satisfied relates to the triggering event.

8. A method comprising:
   receiving, at a message application server that is in communication with an Internet Protocol Multimedia Subsystem network and an Internet Protocol messaging gateway, a message from a first user equipment in response to a determination having been made that an account associated with the first user equipment has a delayed message delivery feature enabled, the message being addressed to a second user equipment, the message being formatted in accordance with a first protocol used by the Internet Protocol Multimedia Subsystem network, and the message comprising a time parameter provided by a user of the first user equipment;
   storing, at the message application server, the message in accordance with the time parameter;
   sending the message to the Internet Protocol messaging gateway in response to the time parameter being satisfied;
   receiving the message at the Internet Protocol messaging gateway from the message application server;
   converting the message from the first protocol to a second protocol used by a message center; and
   sending the message in the second protocol to the message center for delivery to the second user equipment.

9. The method of claim 8, wherein the time parameter comprises a date, a time, or a date and a time at which the message is to be sent.

10. The method of claim 8, wherein the time parameter comprises a time value for a timer, an expiration of which constitutes the time parameter being satisfied.

11. The method of claim 8, further comprising:
   querying, by the Internet Protocol Multimedia Subsystem network, a home subscriber server to determine if the delayed message delivery feature is enabled for the account; and
   sending the message to the message application server in response to determining that the delayed message delivery feature is enabled for the account.

12. The method of claim 8, wherein the time parameter is associated with a triggering event and the time parameter being satisfied relates to the triggering event.

13. A system comprising:
   a processor; and
   a computer-readable storage medium having instructions stored thereon which, when executed by the processor, cause the processor to perform operations comprising:
      receiving a message from a first user equipment in response to a determination having been made that an account associated with the first user equipment has a delayed message delivery feature enabled, the message being addressed to a second user equipment, the message being formatted in accordance with a first protocol used by an Internet Protocol Multimedia Subsystem network, and the message comprising a time parameter entered by a user of the first user equipment,
      storing the message in accordance with the time parameter, and
      sending the message to an Internet Protocol messaging gateway in response to the time parameter being satisfied, wherein the Internet Protocol messaging gateway is configured to convert the message from the first protocol used by the Internet Protocol Multimedia Subsystem network to a second protocol used by a message center and to forward the message formatted in accordance with the second protocol to the message center.

14. The system of claim 13, wherein the time parameter is associated with a triggering event and the time parameter being satisfied relates to the triggering event.

15. The system of claim 13, wherein the time parameter comprises a time value for a timer, an expiration of which constitutes the time parameter being satisfied.

16. The system of claim 13, wherein the time parameter comprises a date, a time, or a date and a time at which the message is to be sent.

* * * * *